No. 824,527. PATENTED JUNE 26, 1906.
W. COLINA.
VALVE.
APPLICATION FILED MAR. 14, 1906.
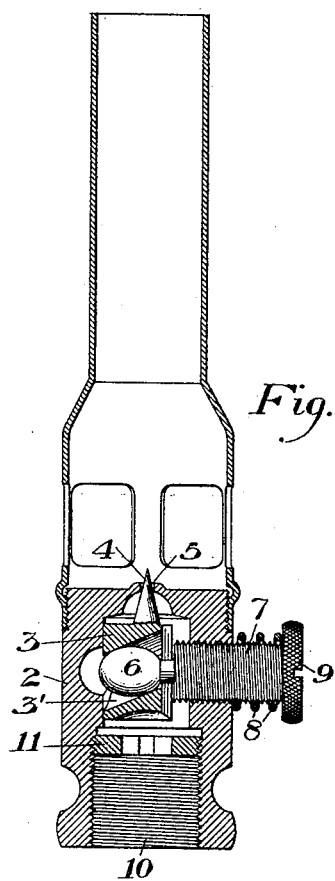
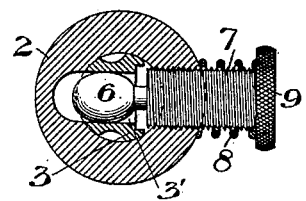
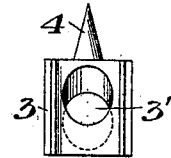
WITNESSES
Warren W. Swartz
R. A. Balderson
INVENTOR
William Colina
by Bakewell & Byrnes
his attys

UNITED STATES PATENT OFFICE.

WILLIAM COLINA, OF WATERBURY, CONNECTICUT, ASSIGNOR, BY MESNE ASSIGNMENTS, TO WELSBACH LIGHT COMPANY, OF GLOUCESTER CITY, NEW JERSEY, A CORPORATION OF NEW JERSEY.

VALVE.

No. 824,527.     Specification of Letters Patent.     Patented June 26, 1906.

Application filed March 14, 1906. Serial No. 306,004.

*To all whom it may concern:*

Be it known that I, WILLIAM COLINA, of Waterbury, New Haven county, Connecticut, have invented a new and useful Valve, of which the following is a full, clear, and exact description, reference being had to the accompanying drawings, forming part of this specification, in which—

Figure 1 is an enlarged sectional side elevation showing my improved valve applied to a gas-burner for incandescent mantles. Fig. 2 is a horizontal section, and Fig. 3 is a front elevation of the sliding valve-block or carrier.

My invention relates to valves, particularly those employed in connection with gas-burners for incandescing-mantles.

The object of the invention is to provide a simple, cheap, and effective device which will give closer regulation than formerly and will also positively move the valve in both directions, thus avoiding the use of springs for moving the valve in either direction.

In the drawings, 2 represents the valve-casing, 3 the valve-carrier or slide, and 4 the needle-valve proper. The valve-carrier is cut away to allow passage of the gas to the valve-control opening 5 and is provided with an inclined hole 3', preferably extending through it from front to back. In this hole is loosely fitted the globular or ball-shaped end portion 6 of a screw 7, which fits within a screw-threaded hole extending through the side of the valve-casing. I preferably employ a spiral spring 8 around the external portion of the screw between its head 9 and the wall of the casing in order to keep the screw-threads tight and avoid leakage. This, however, may or may not be used, as desired.

The axis of the screw extends at an angle to the axis of the inclined hole or passage-way through the valve-block. The action of the ball-shaped end is therefore that of a cam acting upon the upper and lower inclined cam-faces of the hole through the valve-block. As the screw is turned in one direction the ball will act upon the upper wall of the hole to force the needle upwardly slowly, while on turning in the opposite drection the ball-shaped end will press on the lower wall and force the valve downwardly.

In order to hold the parts in place and limit the movement of the valve-slide, I preferably screw-thread the wall of the inlet-passage 10 and provide a disk 11, which is screwed upwardly and which will contact with the end of the valve-slide when it is lowered to a certain limit. The detaching of the screw and falling out of the valve-block is thus prevented. Other means may be provided for this purpose.

The advantages of my invention result from the simplicity of the devices, the slow regulation obtained by the screw action, and the positive movement of the valve in both directions. The device is not liable to get out of order and works smoothly and effectively.

Many variations may be made in the form and arrangement of the parts without departing from my invention.

I claim—

1. A valve having a cam slot or hole and an endwise-movable screw having an inner cam coacting with the walls of the said slot or hole, and arranged to move the valve in either direction by endwise movement of the screw; substantially as described.

2. A valve having a carrier provided with an inclined slot or hole, and a rotary and endwise-movable screw having a cam-shaped end lying within the slot or hole, the axis of the screw being at an angle to the direction of the slot or hole; substantially as described.

3. In a gas-burner, a needle-valve having a carrier-block, an inclined slot or hole in the block, and a rotary and endwise-movable screw extending through the wall of the valve-casing and having a cam-shaped end resting within the slot or hole; substantially as described.

4. In a gas-burner, a needle-valve having a carrier-block, an inclined slot or hole in the block, a rotary and endwise-movable screw extending through the wall of the valve-casing and having a cam-shaped end resting within the slot or hole, and mechanism for limiting the movement of the carrier-block; substantially as described.

5. In a gas-burner, a needle-valve having a sliding carrier, with an inclined slot or hole, and an endwise-movable screw extending through a screw-threaded hole in the casing and having a circular cam-shaped end arranged to bear upon the walls of the slot or hole; substantially as described.

6. In a gas-burner, a needle-valve having a sliding carrier, with an inclined slot or hole, an endwise or movable screw extending through a screw-threaded hole in the casing, and having a circular cam-shaped end arranged to bear upon the walls of the slot or hole, and a spiral spring surrounding the external portion of the screw; substantially as described.

7. In a gas-burner, a needle-valve having a sliding block-carrier with an inclined hole extending therethrough, and a rotary and endwise-movable screw extending through a screw-threaded hole in the casing and provided with a globular or ball-shaped end lying in the hole, the axis of the screw being at an angle to the direction of the hole; substantially as described.

8. In a gas-burner, a needle-valve, a needle-valve carrier having a cam-slot, and an endwise-movable actuator having a cam arranged to force the needle-carrier positively in both directions; substantially as described.

In testimony whereof I have hereunto set my hand.

WILLIAM COLINA.

Witnesses:
EDWARD S. SANDERSON,
CLARENCE P. COOK.